United States Patent [19]

Capuano et al.

[11] Patent Number: 4,754,179

[45] Date of Patent: Jun. 28, 1988

[54] DYNAMOELECTRIC MACHINE

[75] Inventors: Angelo D. Capuano, Ballston Lake; Gordon R. Hallenbeck, Amsterdam, both of N.Y.

[73] Assignee: General Electric Company, Fort Wayne, Ind.

[21] Appl. No.: 945,456

[22] Filed: Dec. 23, 1986

Related U.S. Application Data

[62] Division of Ser. No. 774,557, Sep. 10, 1985, Pat. No. 4,661,734.

[51] Int. Cl.⁴ ............................................. H02K 5/22
[52] U.S. Cl. .................................. 310/71; 29/401.1; 174/50; 361/356
[58] Field of Search ................... 174/49, 50, 52 R, 97, 174/101; 310/71; 361/334, 356, 358, 426, 428

[56] References Cited

U.S. PATENT DOCUMENTS

| | | | |
|---|---|---|---|
| 2,321,999 | 6/1943 | Dalton | 310/71 X |
| 2,543,131 | 2/1951 | Seifried | 310/71 |
| 2,652,506 | 9/1953 | Furnas et al. | 310/71 |
| 2,727,215 | 12/1955 | Brown | 310/71 X |
| 2,728,002 | 12/1955 | Turner | 310/71 |
| 2,874,317 | 2/1959 | Couse | 310/71 |
| 2,916,177 | 12/1959 | Nottelmann et al. | 310/71 X |
| 3,178,618 | 4/1965 | Causey | 361/358 |
| 3,484,860 | 12/1969 | Csaki | 310/42 |
| 3,635,305 | 1/1972 | Kunishi et al. | 174/50 X |
| 3,739,208 | 6/1973 | Shartrand | 310/58 |
| 3,745,229 | 7/1973 | de Vos | 174/97 X |
| 3,990,802 | 11/1976 | Corona | 310/42 X |
| 4,015,155 | 3/1977 | Lang | 310/51 X |
| 4,170,057 | 10/1979 | Roddy et al. | 310/90 X |
| 4,170,058 | 10/1979 | Leffler | 310/90 X |
| 4,295,067 | 10/1981 | Binder et al. | 310/64 X |
| 4,451,750 | 5/1984 | Heuer et al. | 310/71 X |
| 4,471,246 | 9/1984 | Paillet | 29/596 X |
| 4,500,772 | 2/1985 | Ahner et al. | 219/209 |
| 4,501,982 | 2/1985 | McMinn | 29/596 X |
| 4,564,780 | 1/1986 | Nel | 310/42 X |

OTHER PUBLICATIONS

GE Brochure "Custom 8000 Brushless Synchronous Generators", dated 11/78.
GE Brochure "Custom 8000 Induction and Synchronous Motors 250 HP and Larger", dated 3/74.

*Primary Examiner*—Laramie E. Askin
*Attorney, Agent, or Firm*—John M. Stoudt

[57] ABSTRACT

A dynamoelectric machine has a frame to which an accessories conduit assembly is secured, and a plurality of electrically discrete compartments in such assembly has terminal blocks therein only of a predetermined electrical characteristic. A power conduit assembly is releasably attached to the frame to adjustably dispose an aperture in such assembly for receiving power leads in a plurality of preselected positions.

A method of rearranging the position of a rotatable assembly in a frame of a dynamoelectric machine is also disclosed.

8 Claims, 10 Drawing Sheets

DYNAMOELECTRIC MACHINE

CROSS-REFERENCE TO RELATED APPLICATION

This application is a division of the commonly assigned and copending U.S. patent application Ser. No. 774,557 filed Sept. 10, 1985, now U.S. Pat. No. 4,661,734, which is incorporated by reference herein.

FIELD OF THE INVENTION

This invention relates in general to electrical apparatus and, more specifically, to an improved dynamoelectric machine having an accessories conduit box associated therewith.

BACKGROUND OF THE INVENTION

Improved dynamoelectric machines are produced in a myriad of sizes and configurations varying from small, fractional horsepower to extremely large, multiple thousands of horsepower. For purposes of discussion, references will be made here only to integral horsepower alternating current (AC) induction motors which are in the range of about 500 to at least generally about 10,000 horsepower. Machines or electric motors of this power range are generally not custom machines, i.e., they are generally available from a motor manufacturer by specifying required horsepower, shaft RPM and voltage rating. Electrically, however, variations among these three specifiable variables can result in many different arrangements within the motor armature and stator. In addition, since motor speed or shaft RPM is determined by the number of poles, the mechanical structure of the rotor (on which the armature windings are carried) and the stator are varied, not only by the number of poles but also by the physical size of the stator and rotor necessary to support those poles.

Many attempts have been made to overcome the difficulty associated with the many variations in motor arrangements by some form of standardization. U.S. Pat. No. 2,543,131 discusses the standardization problem and addresses the need to provide a terminal block which can facilitate changing from a lower voltage to a higher voltage and from a first speed to a second speed by changing the connections at the block for variations to Delta and Wye connections. However, such an arrangement addresses only a single speed change and voltage change and, while useful, does not address more extensive problems in standardization.

It is desirable, therefore, to provide a machine which incorporates a plurality of features interchangeable between machines of a different size or specification. It is desirable, for example, to provide heating devices which are useable to prevent moisture from condensing into such machines during a cool-down cycle, which devices are applicable to any size machine by varying their number. It is desirable to provide a machine symmetrically constructed with respect to the rotor such that the frame and stator can be positioned in a desired orientation and the rotor inserted with a drive end selectively positioned. It is additionally desirable to provide a frame assembly for a machine in which the orientation of a power conduit box may be selectively changed and in which the location of the power conduit box and an accessory conduit box are variable. It is also desirable to be able to adjust the rotor position in such a machine to align mechanical and magnetic centers.

SUMMARY OF THE INVENTION

Among the several objects of the present invention may be noted the provision of an improved dynamoelectric machine; the provision of such improved dynamoelectric machine having an accessories conduit box with spaced apart partitions defining a plurality of electrically discrete compartments in the accessories conduit box; the provision of such improved dynamoelectric machine in which at least some of the compartments have insulating terminal blocks therein of different predetermined electrical characteristics; the provision of such improved dynamoelectric machine in which the accessories conduit box has means for conducting lead sets of different predetermined electrical characteristics into corresponding compartments of like predetermined electrical characteristics; and the provision of such improved dynamoelectric machine which is simple in design, easily assembled, and economically manufactured. These as well as other objects and advantageous features of the present invention will be in part apparent and in part pointed out hereinafter.

In general, a dynamoelectric machine in one form of the invention has a frame with an accessories conduit box mounted thereto. The accessories conduit box includes a plurality of means for separating it into a plurality of discrete compartments, at least one insulating terminal block disposed in each of at least two of the compartments, and a pair of conduits extending between the compartments across the separating means. A plurality of operating components of the dynamoelectric machine are disposed within the frame. A plurality of leads connected with at least some of the operating components extend through the frame into the accessories conduit box. Some of the leads of one predetermined electrical characteristic are passed through one of the conduits into connection with the at least one insulating terminal block in one of the at least two compartments, and others of the leads of another predetermined electrical characteristic different than the one predetermined electrical characteristic are passed through the other of the conduits into connection with the at least one insulating terminal block in another of the at least two compartments.

DESCRIPTION OF THE DRAWINGS

For a better understanding of the present invention, reference may be had to the following detailed description taken in conjunction with accompanying drawings in which.

DESCRIPTION OF THE PREFERRED EMBODIMENT

General Overview

Figure 1:
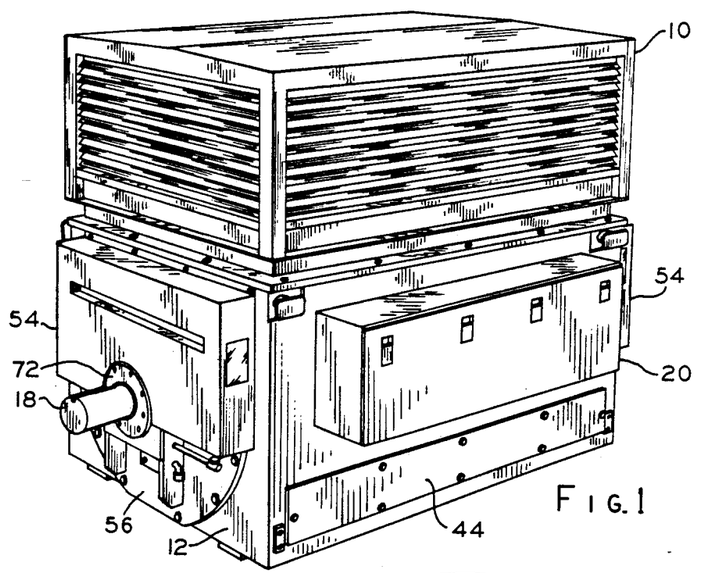
FIG. 1 is a perspective illustration of a dynamoelectric machine in the form of an alternating current motor constructed in accordance with the principles of the present invention.

Referring now to FIG. 1, a preferred embodiment of the present invention illustrates a dynamoelectric machine, such as for instance an alternating current (AC) induction motor or the like although it will be appreciated that the general description will also apply to other dynamoelectric machines, e.g., synchronous motors. In general terms, the motor includes a rotor assembly and a stator assembly supported by and encased in a frame or a frame assembly formed of rigidity imparting frames surrounded by appropriate external supports, panels and shields.

In FIG. 1, the motor includes an air conditioning plenum 10 for processing cooling air within a frame or frame assembly 12. Mounted in the frame assembly 12 is a stator or stator assembly 14 and a rotor or rotor assembly 16 (best seen in FIG. 5). A power take-off shaft or drive end 18 is an extension of a shaft 28 on which the rotor 16 is mounted, and the rotor and the shaft comprise a rotatable assembly. Attached to a side of the motor is an accessory box or accessories conduit box 20 which provides convenient termination and connection points for various condition sensors associated with the motor. On the end of the motor frame assembly 12 can be seen an upper end shield 54 which can be readily removed to allow viewing of internal portions of the motor.

The structure of rotor 16 includes a standard cylindrical body concentric with respect to an axis of rotation of the shaft which supports it. The shaft is supported adjacent its ends by opposite bearing members 26 held, in turn, by end supports or lower end shields 56 to thereby allow rotation of the shaft and rotor concentrically and concurrently. Both the rotor and the stator are wound with insulated wires in a manner well known in the art to convert the input electrical power into mechanical power at the power take off end 18 of the shaft.

Figure 5:
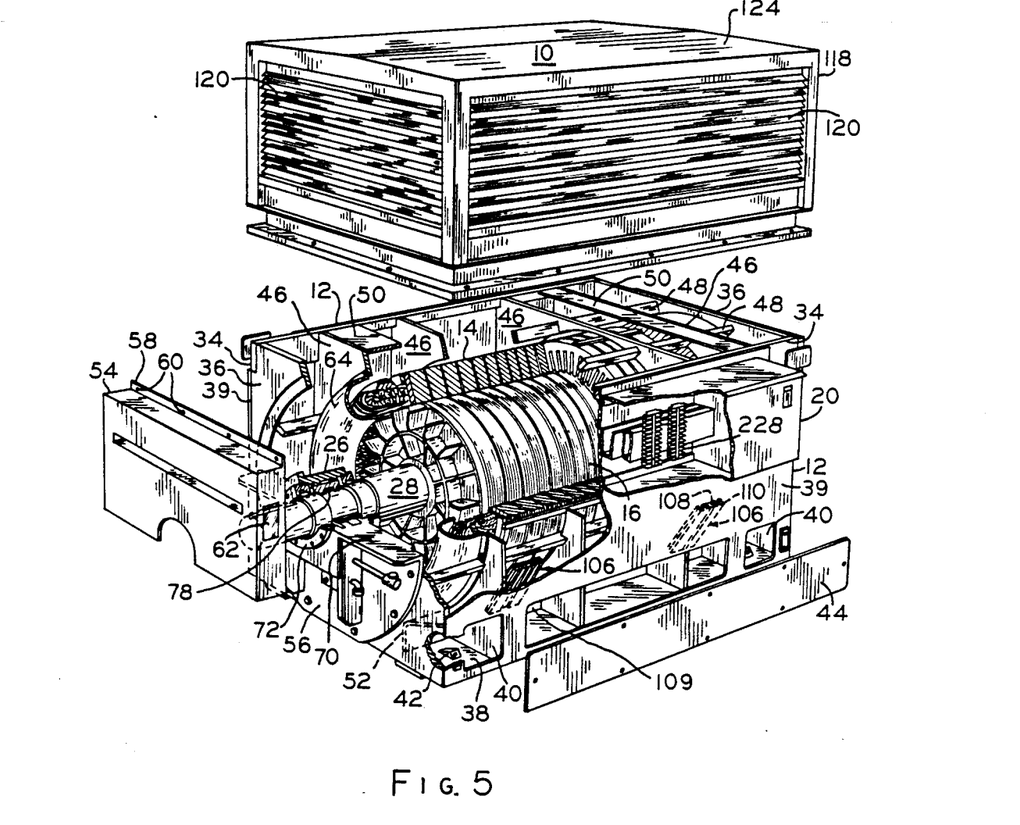
FIG. 5 is a perspective illustration of the motor shown in FIG. 1 but with certain parts exploded away and with yet other parts broken away to illustrate certain internal constructions of the motor.
Figure 5A:
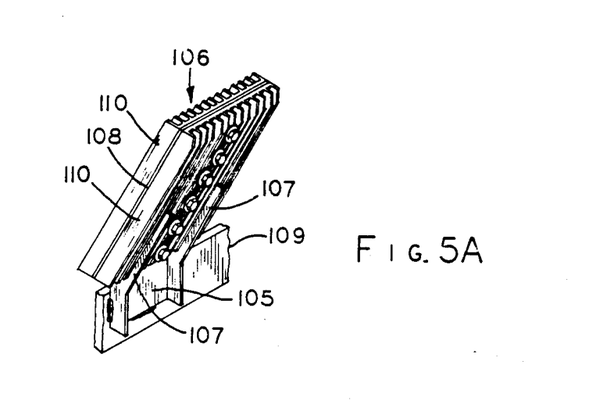
FIG. 5A is a partial cross-section of FIG. 5 showing the heater assembly.

A heating assembly 106 as shown in FIGS. 5 and 5A is provided within the frame assembly 12 of the motor to prevent moisture/condensation from forming upon cooling after use. This is desirable in order to preclude rust-causing moisture from deteriorating the operating components of the motor. The source of heat is preferably low temperature, constant temperature resistance elements, such as for instance an etched foil heater encased in a heat sink such as anodized aluminum. This assembly preferably includes a plurality of groups of heating elements located beneath the stator and rotor with a planar face positioned generally transverse to a radius of the rotor and shaft.

The cooling assembly or air conditioning plenum 10, which constitutes the upper part or portion of the motor, detachably mounts to the top of the frame assembly 12. It has an open lower surface in flow communication with an open upper surface of the frame assembly 12. The cooling assembly 10 in one embodiment includes an air-to-air heat exchanger whereby a sealed flow of air within the motor may be recirculated from the heat generating mechanisms of the motor, e.g., the rotor, stator, shaft and bearings, to the air-cooling conduits of the heat exchanger and back again in a continuous and recirculating path of motion. Fans (shown in FIG. 5) provide the impetus to effect circulation of the air.

Figure 2:
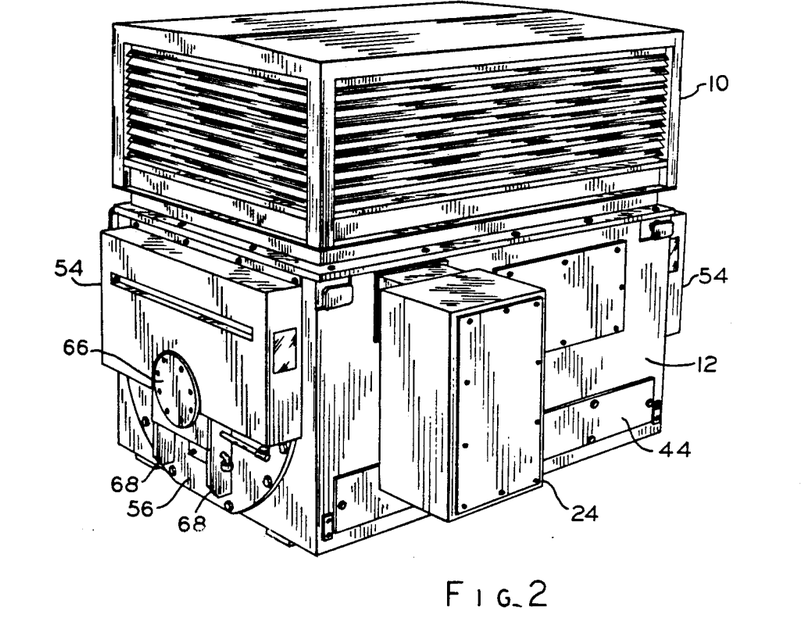
FIG. 2 is a perspective illustration of the motor shown in FIG. 1 viewed from the opposite side and end.

FIG. 2 is a reverse view of the motor of FIG. 1 and particularly illustrates the positioning of a power conduit assembly 24. The power conduit assembly 24 and the accessories conduit box 20 are each physically secured to a side panel or panels of the frame assembly 12. The power conduit assembly 24 includes electrically conductive connector brackets and an electrically conductive bus bar whereby the various electrical leads from the stator may be attached and coupled with power leads from the external source of electrical power. The power conduit assembly 24 has an external aperture or door openable to expose the various internal leads and terminals whereby an operator may alter the interconnection of the leads from both the source of electrical power and from the stator windings so that the operational characteristics of the motor might be modified. For example, an originally coupled Wye connection might be changed to a Delta connection or vice versa. The modification might also include the changing of the source or nature of the power supply, e.g., from 2300 VAC to 4000 VAC. Additionally, the power conduit assembly 24 may be reoriented with respect to the frame assembly 12 by indexing it in 90 degree turns to accommodate power leads entering from above, below or from either side.

The accessories conduit box 20 is provided with insulating terminal blocks with conductive connectors for the appropriate coupling of wires supporting various or selected sensor or sensor means, such as for instance probes, monitoring devices, heaters, etc., within the motor. The accessories conduit box 20 is divided into several compartments with the higher voltage power leads being exposed in one compartment and with the lower voltage signal leads being exposed in another compartment. The positioning of at least some of these various leads is variable at the discretion of an operator. However, the power leads of higher voltage are maintained in a separate compartment from the signal leads of a lower voltage. Readouts, as for certain temperatures including cut-off and trip temperatures, as well as permanently coupled proximeters for vibrations may also be provided.

A closure or door on the accessories conduit box 20 shields the terminals and their wires during motor operation and use. The readouts are preferably located on the door or cover for convenient viewing without opening. Wireways or channels are also provided with open and closed sections so that the power leads are not exposed in the signal leads compartment and so that the signal leads are not exposed in the power leads compartment. Among the signals being detected are the vibrations at the bearings and temperatures at key motor locations. Among the powered features are humidity dissipating heaters, thermostats and switches.

Because of the general configuration of the motor, its position may be readily reoriented in the field. By this it is meant that if, for any reason, the user might wish to relocate the power conduit assembly 24 and accessories conduit box 20 on the side of the machine opposite from its original orientation, such a modification may be readily accomplished. In such a situation, the user would remove the upper end shields 54 and the lower end supports 56 from both ends of the motor and uncouple the shaft 28 from the mechanisms being driven (not shown). The rotor could then be slid axially from the remainder of the frame assembly 12. The frame assembly 12 with stator 14 could be then rotated 180 degrees, i.e., half of a full rotation. This rotation would place the power conduit assembly 24 and accessories conduit box 20 on opposite sides with respect to their original orientations. The rotor would then be slid axially back into the motor and the shaft recoupled with the driven mechanisms. The lower end supports and upper end shields could then be replaced to complete the desired modification.

Such reorientation of the rotor with respect to the frame and the stator is made possible since the rotor and shaft are symmetric about a plane passed radially through the rotor and shaft midway between the lower end supports and bearings.

The cooling assembly 10 which constitutes the upper part of the motor need not be uncoupled from the frame of the motor during this reorientation. In such situations, however, where a superior, cooling, ambient air exists at one end of the motor or other, it is possible to uncouple the cooling assembly 10, reposition it one-half of a turn, i.e. 180 degrees, and then recouple it to the frame assembly 12 of the motor. In this manner, it is still possible to take advantage of the preferred source of cooling ambient air.

Another situation where it might be desired to rearrange and re-orient the rotor end-for-end with respect to the stator would be where it is sought to power a differently positioned mechanism or to power the same mechanism but from a different side without changing stator position. In such situations, the reorientation would be accomplished by removing the rotor 16 and repositioning it 180 degrees i.e., end-for-end, with respect to the stator. The power conduit assembly 24 and accessories conduit box 20 would then remain in their original position.

Figure 3:
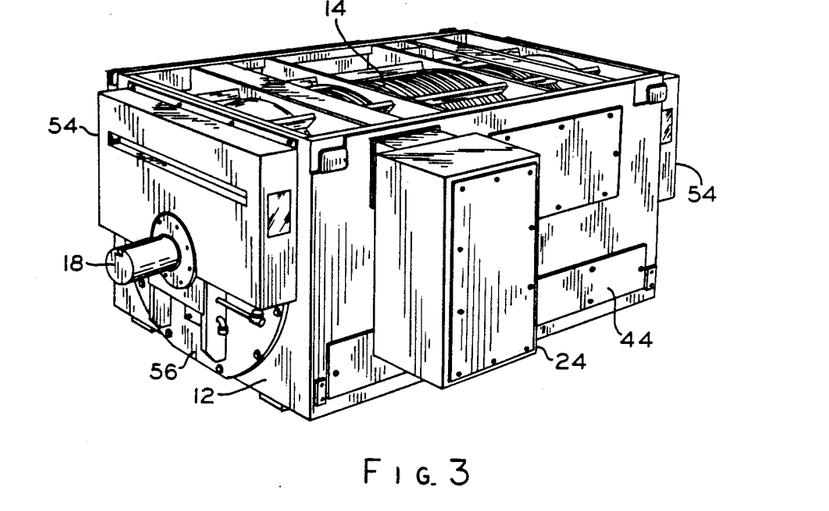
FIG. 3 is a perspective illustration of the motor of FIG. 1 with the air conditioning plenum removed.
Figure 4:
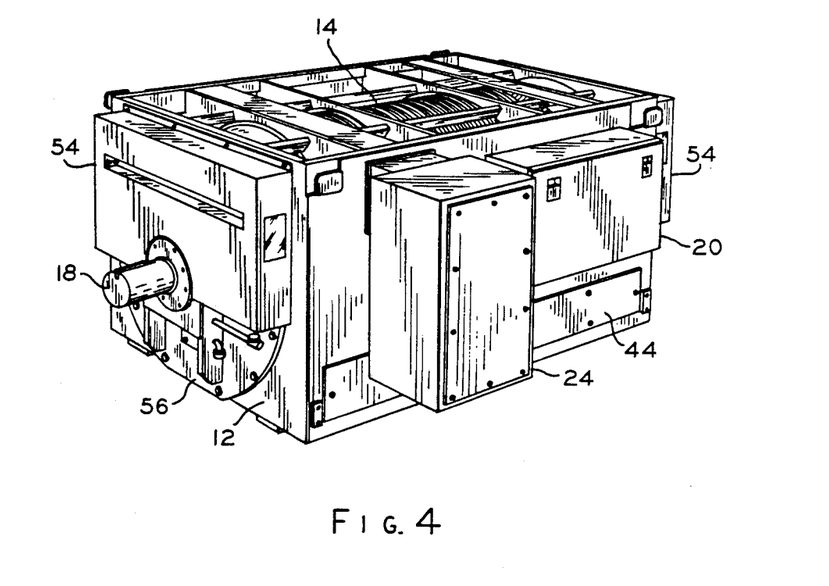
FIG. 4 is a perspective illustration of the motor of FIG. 3 with an accessory box and a power connection box selectively located in a predetermined manner on a common side.

Referring briefly to FIGS. 3 and 4, there are illustrated two alternative arrangements of the power conduit assembly 24 and accessory box 20. In FIG. 3 the accessory box 20 is located on a side of the motor opposite the side to which the conduit assembly 24 is mounted. In FIG. 4, both the assembly 24 and box 20 are selectively placed on the same side of the motor. As will become apparent, in order to place both assembly 24 and box 20 on a common side, a modification of box 20 is required.

Rotor and Stator Assemblies

Turning now to FIG. 5, the partial exploded view of the inventive motor illustrates, among other features, the mounting and positioning of the stator 14 and rotor 16. As is well known in the art, rotor 16 has a generally cylindric circumferential surface interposed between a pair of generally opposite end faces although only one opposite end face of the rotor is shown in FIG. 5 for the purpose of drawing simplification, and in general terms, the rotor 16 and stator 14 are supported by, and encased in, the frame assembly 12 formed of rigidity imparting frame members surrounded by appropriate panels and the like to enclose the rotor, stator and other operating elements. The bearing assemblies 26 for supporting shaft 28 which, in turn, supports the rotor 16 for rotational movement concurrently and concentrically together, is supported in turn on lower end supports 56 for allowing the smooth, friction-reduced rotation of the shaft 28. Thus, rotor 16 and shaft 28 comprise the rotatable or rotor assembly. The stator 14 is fixedly positioned within the frame assembly 12 through suitable brackets.

The rotor 16 and the stator 14 are each individually formed with current conductors in a manner well known in the art to convert the input electrical power into mechanical power. In one type of motor, the conductors of the rotor 16 are supported on a squirrel cage cylinder. The conductors are essentially lineal bus bars running parallel to the axis of the rotor for interacting with the electrically rotating field poles of the stator 14 for converting the electrical energy input to the stator windings into mechanical energy for driving a mechanical mechanism coupled to the power take off shaft 18.

The windings of the stator 14 are formed individually and assembled outside the frame assembly 12 into a complete stator 14. The windings are of a type well known in the art comprising plural wires or conductors which are formed on multiple stator laminations punched from a ferromagnetic material, such as for instance silicon steel, which are stacked and compressed to form the core of the stator. Albeit not shown, the windings of the stator 14 may be oriented in any one of a plurality of electrical configurations, and such stator windings may have any even number of electrical poles desired which, may be utilized in different desired numbers of circuits. Three phase power may be connected as input either through a Delta or Wye connection. Depending on the configuration of the poles, circuit, phase and connection, the operating characteristics of the motor may thus be modified.

Certain types of changes to the operating characteristics of the present motor may be effected at the power conduit assembly 24. Such changes might include reconnections for different applied voltages or might be in the connection configuration utilized, as for example, whether the power is applied through a Delta or Wye type of connection. Changes more extensive than these, such as the number of electrical poles, number of circuits, number of phases, or the like, are not normally field changes and would require internal circuit changes or further changes within the stator.

Figure 6:
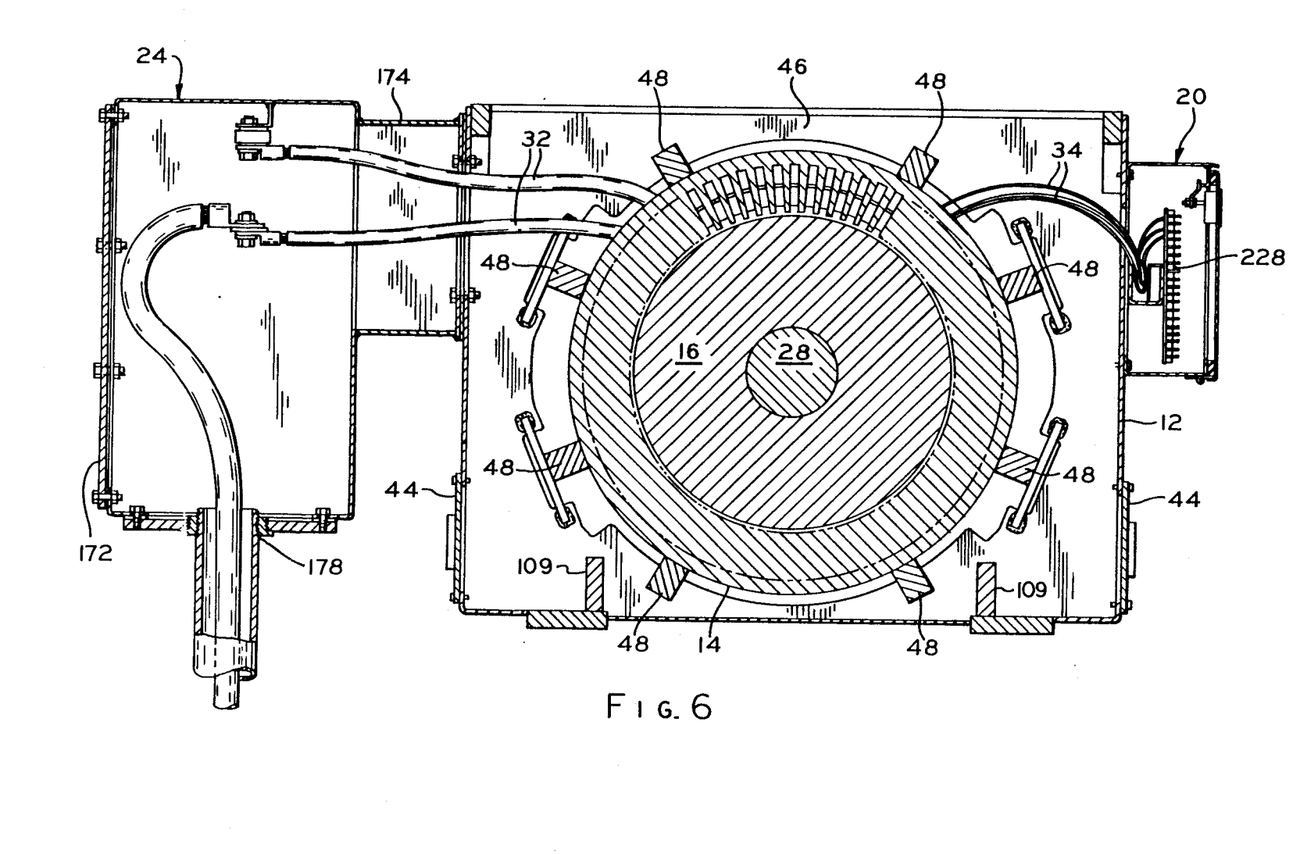
FIG. 6 is a sectional view of the motor shown in FIG. 5 taken radially through the machine and through the power conduit assembly and accessories conduit assembly.

FIG. 6 is a sectional view of the motor which illustrates the mechanical arrangement of the leads 32 from the stator windings to the power conduit assembly 24. This Figure also shows some of the wire leads 34 from the accessory box 20 to the motor. Each of these elements will be discussed in more detail below.

Figure 7:
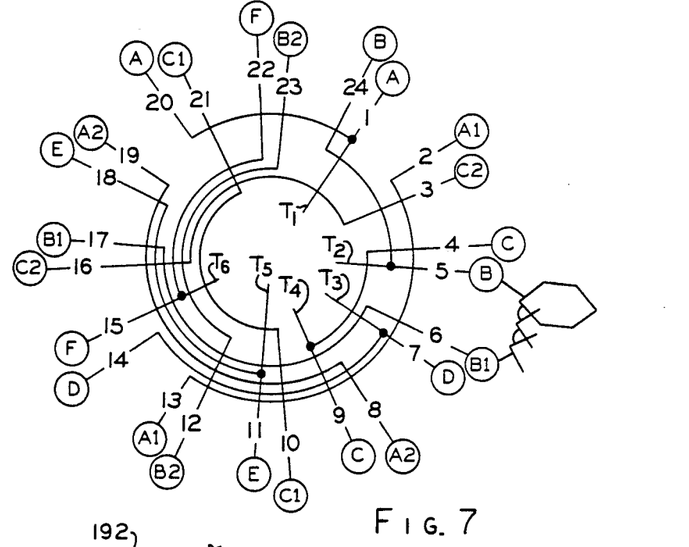
FIG. 7 is an alternate electrical schematic diagram of one winding configuration for a stator for the motor of the present invention.
Figures 12, 13:
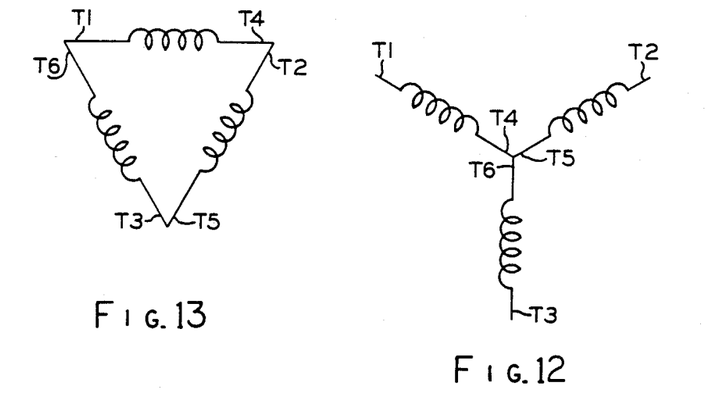
FIG. 12 is an electrical schematic illustrating the coupling of the stator power supply leads in the power conduit box in a Wye connection for the wiring configuration of FIGS. 10 and 11.
FIG. 13 is an electrical schematic illustrating the coupling of the leads in the power conduit box in a Delta connection for the wiring configuration of FIGS. 8 and 9.

FIG. 7 is an electrical schematic illustration of a representative or standard stator wiring diagram with five slots per pole per phase. Although a great number of wiring diagrams might be utilized, this one is shown and described for illustrative purposes only. FIG. 7 is a four pole, two circuit, three phase configuration. In this standard stator wiring diagram well known in the art, the leads brought out from the stator windings are consecutively numbered 1L-24L, and all such leads having the same circled letter or same circled letter and number notation are interconnected with each other. Both ends of all three phases, indicated by terminals T1-T6, are brought into the power conduit assembly 24 to permit connection of the stator winding in a Wye or Delta configuration, as illustrated in FIGS. 12 and 13 and further discussed hereinafter. This type of arrangement is referred to as an independent stator connection.

Figure 8:
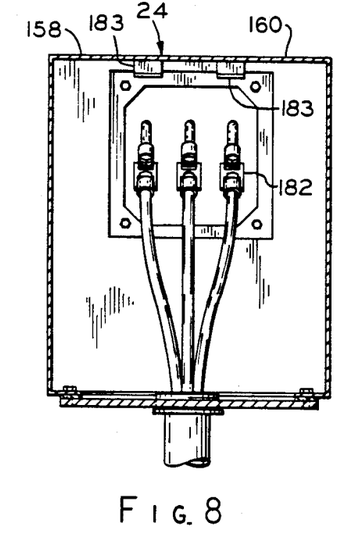
FIG. 8 is a front sectional view of the power conduit assembly and coupled leads from the stator windings and power source for an independent stator connection arranged in a Delta configuration.
Figure 9:
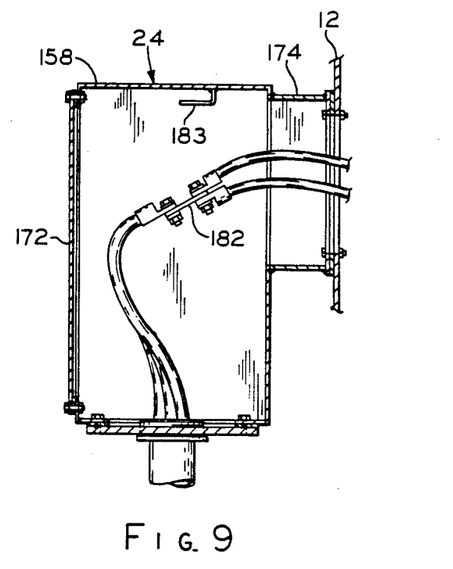
FIG. 9 is a sectional view of the power conduit assembly of FIG. 8 but viewing the leads and terminals from a side elevational view.
Figure 10:
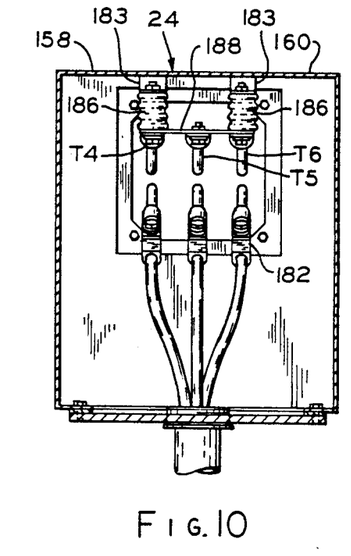
FIG. 10 is a front sectional view of the power conduit assembly and coupled leads from the stator windings and power source for an independent stator connection arranged in a Wye configuration.
Figure 11:
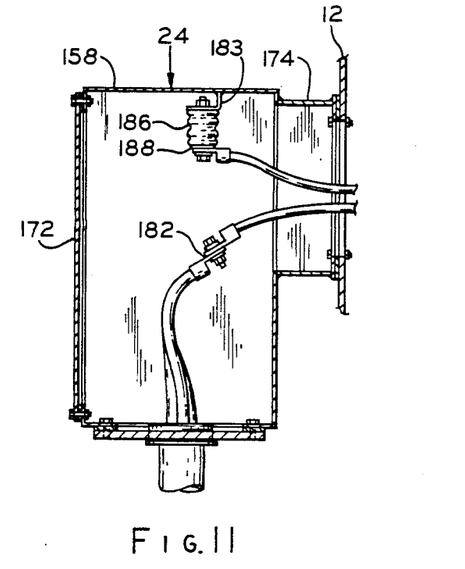
FIG. 11 is a sectional view of the power conduit assembly of FIG. 10 but viewing the leads and terminals from a side elevational view.

FIGS. 8 and 9 are mechanical views illustrating the connections of the leads at the power conduit assembly 24 for a Delta connection. FIGS. 10 and 11 are mechanical views illustrating the connections of the leads from the stator windings in a Wye connection. FIGS. 13 and 12 illustrate the electrical lead couplings at the power conduit assembly of FIGS. 8 and 10, respectively, in electrical schematic illustrations.

Frame Assembly

As can best be seen in FIG. 5, the entire motor is supported by a frame assembly 12 which includes frame pieces such as axial side bars 34 of heavy strength sheet material, transverse end plates or end portions 36, and a bottom sheet member 38 of similar rigid construction. As used herein, the terms axial and transverse are intended to mean in those orientations axial and transverse with respect to the axis of the shaft 28. These frame pieces are welded together adjacent their common edges to create a rigid frame for the various internal components of the motor as well as the other supports, panels and the like. The sides of the motor are covered by side panels 39 which may be of a lesser gauge steel plate and are preferably welded to the frame pieces at their peripheries. Located on the faces of both of the side panels 39 are lower apertures 40 to provide for acess to mounting and leveling studs 42. A cover plate 44 is provided on each side in association with each of these lower apertures for sealing the internal components of the motor for safety and cleanliness purposes. The plates 44 are held in place by screws to allow for their convenient attachment and removal.

Additional rigidity is supplied to the motor frame assembly 12 through the use of vertical, transverse support plates 46 which are appropriately shaped to permit the positioning of the stator 14 within the frame assembly 12. Further braces 48 pass axially through apertures in the transverse support plates 46 and are attached to the end plates 36 while additional cross braces 50 are supported perpendicular to support plates 46 for joining the side panels 39. These braces 48, 50 are so configured as to allow operator access to internal components of the frame assembly 12 through the open upper face thereof when the cooling assembly 10 is removed. The cross braces 50 are also positioned and configured to define the appropriate path of travel of cooling air between the tubes of the air-to-air heat exchanger of cooling assembly 10 and the heat generating mechanisms of the motor. Angled brackets 52 are provided along the lower face of the machine to provide additional rigidity to the frame assembly 12.

The end plates 36 of the frame assembly 12 include generally axially aligned openings or passage means 36a through which rotor 16 and shaft 28 may be passed upon the reorientation thereof as previously mentioned, and the openings are preferably closed by two piece end shield arrangements with each such arrangement having a readily removable upper end shield 54 formed as a vertical panel which is mounted above a lower end support 56 accommodating the ends of the shaft 28. Suitable releasable coupling means, such as for instance a plurality of screws or bolts or the like, extend through a plurality of apertures 60 in a flange 58 on upper end shield 54 for releasably securing or attaching them to the end plates 36 of the motor, and other such releasable coupling means extend through other such apertures (not shown) in lower end support 56 for releasably securing or attaching them to the end plates of the motor. More particularly, the window 62 is aligned with a viewing window in bearing assembly 26 to permit inspection of bearing lubrication without disassembly. Additionally, generally torus shaped stator end turn shields 64 are mounted to internal vertical transverse support plates 46 adjacent the windings of each end of the stator 14. Although only one stator end turn shield 64 is shown only at one end of the motor, it should be understood and appreciated that a complementary stator end turn shield of similar design is located on the opposite side and end of the motor.

Referring briefly to FIGS. 1 and 2, it can be seen that the aforementioned two piece end shield arrangement is substantially identical on each end of the frame assembly 12, the difference between each end lying only in the generally circular cover plate 66 arranged distal from the power take off shaft end 18. In order to provide accurate and structural support for the shaft, lower end supports 56 may be constructed of heavy gauge metal reinforced with struts 68. The bearing assemblies 26 are mounted to and supported by lower end supports 56. These lower end supports 56 along with the upper end shields 54 are releasably secured to end plates 36 generally about openings 36a therein, as previously mentioned, and must be removed prior to the removal of the shaft 28 and rotor 16 through one of the openings. A horizontal flange 70 is rigidly secured, as through welding, to the upper edge of each lower end support 56, and the flange is appropriately machined and shaped for the reception of the bearing assembly 26.

A generally annular cover plate 72 is formed with an aperture through which the power take off shaft 18 may pass during operation and use of the motor, and the annular cover plate is appropriately bolted in securement to the end support 56 and the bearing assembly 26. At the opposite end of the motor there is provided circular plate 66 which is bolted to the end support 56 for appropriately sealing off this end of the motor.

Bearing Assembly

The bearing assembly 26 is duplicated at each end of frame assembly 12 for supporting the shaft 28 at opposite ends of the motor. Referring now to the cross-sectional view of FIG. 14, each bearing 26 includes a tilting sleeve bearing pad 74 through which the shaft 28 passes and by which the areas of the shaft adjacent its opposite ends are supported. The bearing is provided with an internal split bearing shell 76 of upper and lower sections apertured for the passage of rotatable oil splash rings 78. At its upper extent, each oil splash ring is exposed for observation by an operator to verify its movement during operation and use.

Figure 14:
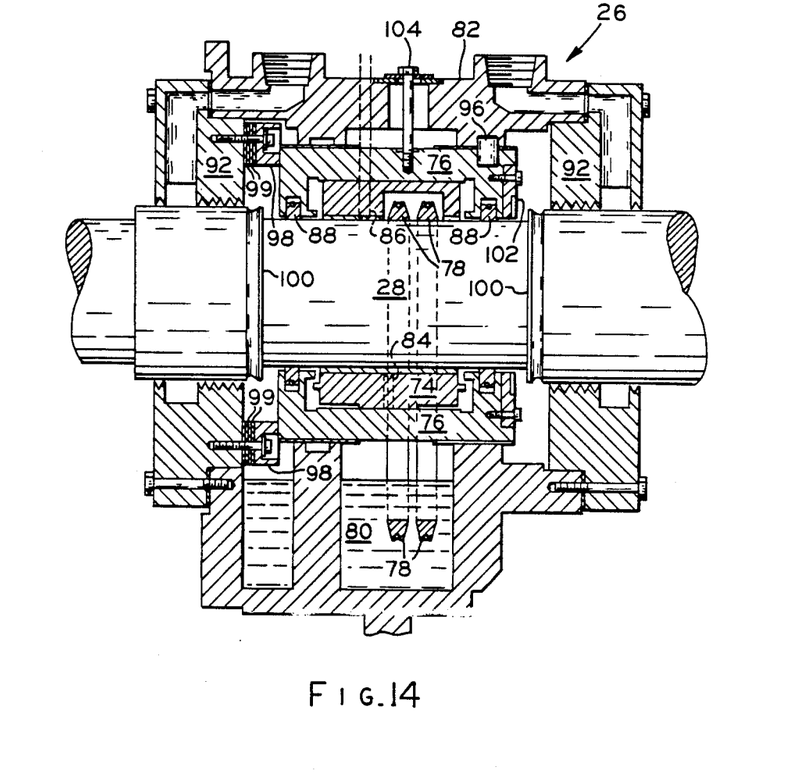
FIG. 14 is a sectional view of the shaft and a bearing taken vertically along and through the axis of the shaft and bearing.

During operation and use of the motor, the shaft 28 will rotate while the bearing shell 76 remains fixed. Rotation of the shaft 28 will rotate the oil splash rings 78 in a path of movement to continuously bring sequential segments of the splash ring laden with oil from oil bath 80 to thereby lubricate the shaft 28 at its interface with the internal surface of the bearing pad 74. Continued rotation of the shaft and splash rings 78 can thus be observed as sequential sections of the ring expose themselves above the bearing shell 76 for viewing by the operator. Viewing is achieved through a fixed bearing cap 82 having a viewing aperture 82a therethrough and a transparent window W located therein. In the event of a seizure of the oil ring 78 as viewed through the aperture in the bearing cap 82 or for other lubrication malfunctions, such condition can be observed by the operator and corrective action taken.

Inner oil seals 88 are provided as rings in cutout sections of the bearing shell 76. Outer oil seals 92 are provided externally of the bearing shell with the bearing cap 82 located therearound to complete each bearing assembly.

An antirotation pin 96 secures together the internal bearing shell 76 and the external bearing cap 82 against rotation with respect to the shaft and with respect to each other. An endplay adjustment block 98 is also provided for permitting alignment of mechanical and magnetic centers of the motor. Other elements within each bearing are oil slingers 100, a thrust plate 102, and for the power take off end only, a grounding screw 104. A bearing temperature sensor 84 positioned in pad 74 provides a signal representative of bearing temperature while a proximity probe 86 provides an output signal representative of shaft vibration as evident by variations in spacing between shaft 28 and probe 86.

As mentioned previously, upper end shield 54 includes a view window 62 aligned with the aperture and window in the bearing assembly to permit examination of bearing assemblies 26 without disassembly. The windows may be formed of tempered glass or other transparent material. These windows allow the operator to view the bearing assembly 26 and, more particularly, the oil splash rings 78 of each bearing during operation and use of the motor without removing any motor component.

The end-play adjustment block 98 allows the bearing assembly to be adjusted relative to the motor frame assembly 12. Since the rotor is positioned by the bearing assemblies, the effect of the adjustment block 98 is to shift the position of the rotor with respect to the stator which is attached to the frame assembly. This realignment of the mechanical position of the rotor is necessary in order to force the mechanical center of the rotor to be aligned with the magnetic center. In general, the rotor is provided with approximately one-half inch of end play to allow the user to shift the power take-off shaft 18 slightly for alignment with external equipment and to allow some motion of the shaft to compensate for thermal shifts in position. During manufacture and testing, the magnetic center of the motor is determined and marked on the shaft for subsequent referral by a motor user. Since the shaft will tend to move to the magnetic center during operation, the user necessarily is forced to align the shaft to the magnetic center position in order to avoid any thrust type of forces being placed on either the driven equipment or on the shaft of the motor itself. As will be appreciated, if the mechanical center does not coincide with the magnetic center, the allowances for shaft movement, i.e., end play, may not be plus or minus ¼ inch but may in fact be plus 7/16 inch and minus 1/16 inch. In such situations, thermal shift of the shaft during operation may cause a shoulder on the shaft to contact the bearing assembly resulting in damage to the motor. The adjustment blocks 98 include a plurality of shims 99 which can be taken from one of the blocks and added to the block at the other end of the shaft in order to shift the mechanical center of the rotor. The adjustment blocks provide an advantageous method of aligning the mechanical and magnetic centers without requiring disassembly of the bearing assemblies in the motor in order to locate the bearings at the proper position.

Heater Assembly

A plurality of heating assemblies 106 are provided within the frame assembly 12 to prevent condensation from collecting on the components of the motor when it is shut down after operation. At least two of the heating assemblies 106 can be seen with reference to FIG. 5 and each includes a resistance element 108, a heat sink 110 and a support. Power is supplied to the resistance elements 108 of the heater from the accessory conduit box 20 through appropriate power leads. The heating resistance elements 108 are preferably configured to such dimensions as to maintain a predetermined low, constant temperature regardless of the time the electrical power is supplied thereto. An appropriate material for such resistance elements is an etched foil of a thermal and electrical conductor which can be bonded to a face of an insulating support such as Bakelite, a ceramic, a thermosetting plastic or similar material. The bonding may be effected as is common in printed circuit board technology.

A more detailed view of a heating assembly 106 may be had by reference to FIG. 5A which is a cutaway sectional drawing of that portion of FIG. 5 containing a heater assembly 106. As is shown, each heater is supported by a brace 105 having a pair of cantilevered arms 107 which support and position the heater substantially perpendicular to a radius of the stator. The brace 105 is attached to a bar 109 by welding, clamping or other means well known in the art.

Surrounding each resistance element 108 is heat sink 110 fabricated, for example, of anodized aluminum. The internal surface of the aluminum corresponds in cross-section of a shape preferably the same as the external surface of the resistance element, rectangular in the disclosed embodiment. The selection of the etched foil resistance element is preferred over prior art materials as, for example, Calrod surface heating unit type material which continuously increases in heat output as additional electrical power is applied over time.

In prior art heaters, such as those described above, there was a tendency of the heating elements to go far beyond the temperatures desired for the present application. Thermostats have been used to hold down such temperatures by cycling. Alternatively, another approach included increasing the length of the heating element to thereby decrease the heating current. This allowed the heater to operate at lower temperatures. Unlike the present invention, however, the prior art structures required increases in costs of materials to yield lesser thermal outputs. Such prior art deficiency is not present in the instant inventive heating assembly 106. The advantage of the etched foil resistance element 108 is that it can be engineered and designed not to exceed a predetermined temperature as, for example, 120 degrees Centigrade in the preferred embodiment of the invention, regardless of the time the particular voltage is applied thereto.

The need for heater 106 occurs after the motor has been turned off following continued usage. During the time of operation and usage, heat is generated by the electrical power and mechanical rotating elements. Upon turning off the motor, the internal heat rapidly becomes dissipated and moisture condenses out of the air and can deteriorate various components of the motor, including electrical insulation and metallic surfaces. The use of the heaters for a preselected time tends to minimize the condensation problem and, thereby, extend the life of the motor.

Power to the heater assemblies 106 is from the accessory conduit box 20 and may be manually activated and inactivated. In the alternative, it could be automatically actuated through a thermistor or other temperature sensor. It could also be cut off when a particular reduced temperature is reached or it could be cut off through a timed activation and inactivation if the normal operating parameters of the machine and its environment were understood.

In practice, groupings of such heaters 106 have been provided within the frame assembly 12 of the motor secured through appropriate angled brackets to a bottom frame member of the motor. The angling, generally perpendicular to a radius of the rotor and stator, will present a maximum surface area to the stator 14. By placing the groups of heating elements adjacent the bottom of the motor, heat will be directly applied first to the lower regions of the motor and will rise upwardly to most efficiently effect the heating of the motor and evaporation of the moisture as required. Such groups of heaters are preferably located beneath the rotor and stator with two groups at each end of the motor and with two groups of heaters on each side of the motor.

Cooling Assembly

Figures 17, 18, 19:
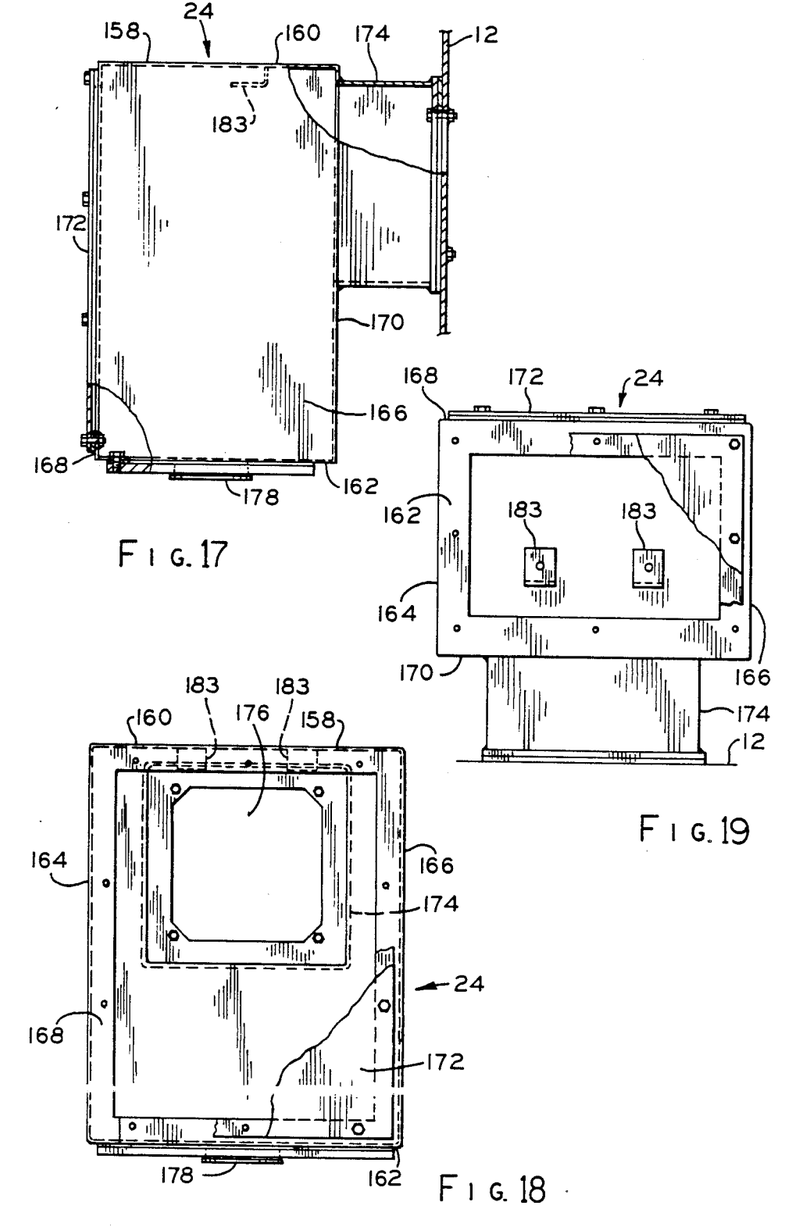
FIG. 17 is a side elevational view of the power conduit assembly of the motor shown in FIGS. 1-5 with parts broken away to show certain internal consructions.
FIG. 18 is a front elevational view of the power conduit assembly shown in FIG. 17 with parts broken away to show certain internal constructions.
FIG. 19 is a bottom view of the power conduit assembly shown in FIGS. 17 and 18 but with parts broken away to show certain internal constructions.

Among the other operational assemblies of the machine is the cooling assembly or air conditioning plenum 10 which mounts to the top of the frame assembly 12 of the motor. The lower surface of the cooling assembly 10 is in flow communication with the open upper surface of the motor as shown in FIGS. 5 and 17.

Figure 15:
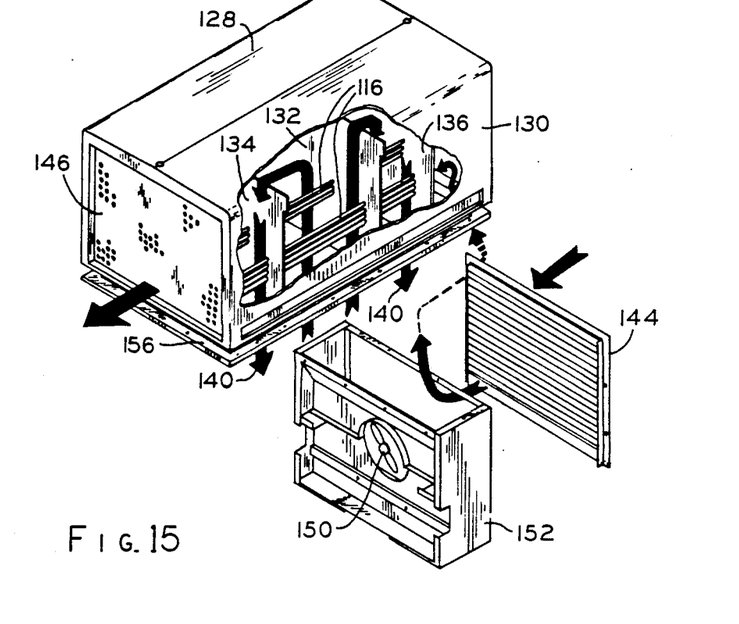
FIG. 15 is an exploded perspective illustration of a cooling assembly.
Figure 16:
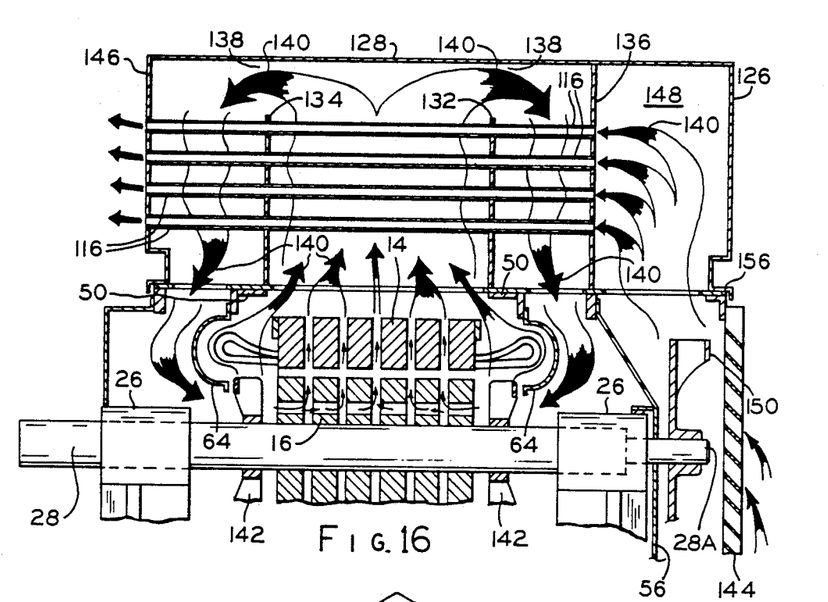
FIG. 16 is a partial cross-sectional view taken through the motor and cooling assembly of FIG. 15.

The cooling assembly 10 illustrated in FIGS. 1 and 2 may be either a NEMA weather protection type (1) or type (2) enclosure. In such enclosures, the internal fans within the motor attached to the shaft 28 serve to force air to be pulled in through the enclosure and down into the motor and then blown back outwards through the louvers in the sides of the enclosures. The NEMA standards dictate the number of bends through which the air must pass before entering the motor depending upon the type of weather protection desired. FIG. 5 also shows the same type of cooling assembly as is shown in FIGS. 1 and 2. The cooling assembly illustrated in FIGS. 15 and 16 is referred to as a totally enclosed air-to-air cooling assembly and is arranged somewhat differently than the aforementioned NEMA weather protection type (1) or type (2) cooling assemblies. In particular with reference to FIG. 16, it can be seen that the motor shaft 28 includes an additional extension 28A passing through the lower end support 56. An additional fan 150 is mounted on the shaft extension 28A. The fan 150 is enclosed in a fan casing 152 which is mounted on the end of the motor. For this type of arrangement, the end shield 54 is removed from the end of the motor to which the fan 150 is attached. The fan casing 152 then provides the enclosure for the end of the motor and also provides an air directing conduit for air pulled in through the louver assembly 144. The fan casing 152 and louver assembly 144 are shown disassociated from the motor in FIG. 15.

The cooling assembly of FIGS. 15-16 is an air-to-air exchanger whereby a sealed flow of air within the motor may be recirculated from the heat generating mechanisms of the machine—the rotor, stator, shaft, bearings, etc.—to the air cooling conduits 116 of the heat exchanger and then back again in a continuous and recirculating path of motion. This path of movement is indicated by the arrows 140 of FIGS. 15-16.

The cooling assembly 10 of FIG. 5 is formed of an external rigid frame member 118 as of sheet metal in a generally rectangular configuration with louvers 120 on the four opposing vertical faces and with an enclosing sheet metal roof 124 thereabove. The totally enclosed cooling assembly of FIGS. 15-16 has a similar external frame construction but without louvers. The cooling assembly has a sheet metal top 128, closed sides 130 and closed end 126. The lower face is open while vertical transverse braces 132, 134 and 136, divide the internal air flow into paths of travel as indicated by the arrows 140.

Fans 142 attached to shaft 28 direct the air flow around the interior vertical braces within the confines defined by the chamber of the cooling assembly 10. The air is directed upwardly at the central section of the motor to bring the heated air to the central section of the air conditioning assembly 10 past the plurality of cooling conduits 116 of the air-to-air condenser. This air is sealed or otherwise contained within the motor solely for cooling purposes. The air flow can best be seen by reference to FIG. 16. The air passes through passageways 138 above the interior vertical braces 132 and 134 then downwardly and again past the heat exchanger conduits 116. The air flow is then passed or circulated into the interior segments of the motor to cool by dissipating its heat. Cross support members 50 at the upper section of the motor and stator winding end turn shields 64 guide this path of flow of the cooling air.

The exterior plate 146 of the cooling assembly provides for termination and support of the cooling conduits 116. At the first, or air input, end an air inlet chamber 148 is located for receiving ambient air for passage to and through the sets of cooling conduits 116. The fan 150 within the fan casing 152 draws air in through louver 144 and forces it through conduits 116. The heated air from the motor passes by the conduits at least twice and is cooled by such contact. As best seen in FIG. 16, the air from the motor is forced into the center section of the cooling assembly between the plates 132 and 134 by the fans 142 on the rotor shaft 28. The air circulates over the plates 132 and 134 and re-enters the motor.

An enlarged apertured plate 156 with downwardly turned flanges is secured to the lower face of the cooling assembly. A horizontal extent of its periphery is provided with holes for being bolted to the upper edges of the frame assembly 12. This plate secures the external frame with respect to the cooling assembly for attachment to the lower part of the motor. The plate 156 is essentially the same in each embodiment of the cooling assembly, differing only in size since the totally enclosed motor has the fan casing 152 which effectively lengthens the motor.

Power Conduit Assembly

As shown in FIGS. 2, 3, 4 and 6, mounted on one side panel 39 of the motor is the power conduit assembly 24. The power conduit assembly 24 is adapted to provide the location and elements for coupling the leads from the stator 14 with the leads from a source of electrical power. Referring to FIGS. 17-19, the power conduit assembly 24 includes a power conduit box 158 generally rectangular in configuration with rectangular top and bottom faces 160 and 162, side faces 164 and 166 and front and back faces 168 and 170. These faces are generally welded together or otherwise secured to constitute a rigid structure. The front face includes a panel 172 removably secured to inturned flanges of the top, bottom and side faces. The removable panel constitutes a door to provide easy operator access to the interior of the power conduit box.

The power conduit assembly 24 also includes a minor extension 174 welded to the power conduit assembly over or generally about an aperture 176 in the back face 170 of the power conduit assembly. On the opposite end of the minor extension 174 are inturned flanges with an aperture symmetrically matched to an aperture in a side panel of the motor frame assembly 12. Fastener holes of the minor extension 174 are symmetrically located and are provided on each of the four flanges so that the power conduit assembly 24 might be indexed 90 degrees, 180 degrees or 270 degrees from the orientation as shown. Fasteners, such as steel bolts, would be removed and reapplied to allow this securement at the discretion of an operator.

Referring to FIG. 17, positioned at the bottom face 162 of the power conduit assembly 24 is a smaller aperture 178 for permitting the passage of power leads from a source of electrical power to the interior of the power conduit assembly 24. The indexing of the power conduit assembly 24, as described above, will permit the appropriate positioning of the power line aperture 178 and power conduit box most conveniently with respect to the location of the incoming power leads for coupling to the motor leads. As shown in FIGS. 18 and 19, there are provided brackets 183 to which the power connection terminals may attach. Referring to FIGS. 10 and 11, the stator winding terminals T4, T5 and T6 are connected by a bus bar 188 which is attached to the brackets 183 by means of insulators 186. The terminals 182 connecting the stator leads to incoming power leads are fabricated of electrically conductive material, preferably copper, and apertures are provided in the terminals for the attachment of the leads from the source of power as well as from the motor. To form the Wye connection shown in FIGS. 10 and 11 the bus bar 188 is positioned with apertures, preferably three in number, for coupling together the motor neutral leads T4, T5 and T6.

As used herein, the term top is intended to mean the top face 160 of the power conduit assembly 24 as viewed in FIGS. 2-6. It is intended that such specific face of the power conduit assembly 24 may be indexed to another orientation whereat another face of the power conduit box is vertically above the top face.

FIG. 8 shows schematically a typical electrical coupling configuration at the motor while FIGS. 9 through 11 illustrate the mechanical coupling for Delta and Wye connections within the power conduit assembly 24. FIGS. 12 and 13 are electrical schematics of these couplings within the power conduit assembly 24.

Reference is now made to the specific stator winding diagram of FIG. 7 which is of a four pole, two circuit, three phase, independent connection configuration. All leads with the same symbols connect together and it is intended that five slots be utilized for each pole for each phase. The leads from the stator windings through the slots pass as indicated to the power conduit assembly 24 and are coupled to the three conductive terminals in the configuration shown in FIGS. 8 through 11. The numerals on the leads correspond with those in the electrical schematic diagram of FIG. 8. The arrangement of these leads within the power conduit assembly 24 are shown schematically in FIGS. 12 and 13 with the three inductor symbols corresponding to the three circuits of wires around the stator representing the three phases of windings.

Accessories Conduit Box

Figure 20:
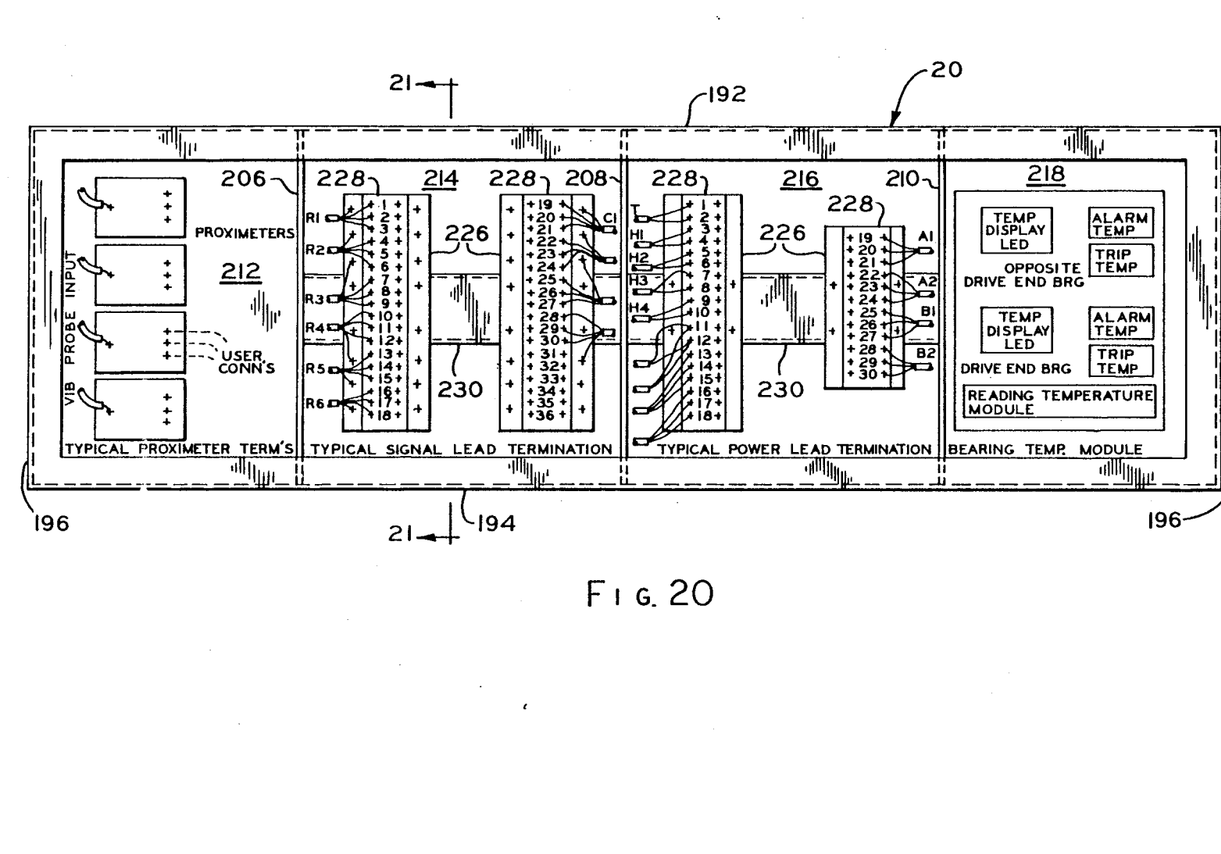
FIG. 20 is a front elevational view of the accessories conduit assembly as shown in FIGS. 1 and 5 with the door removed.
Figure 21:
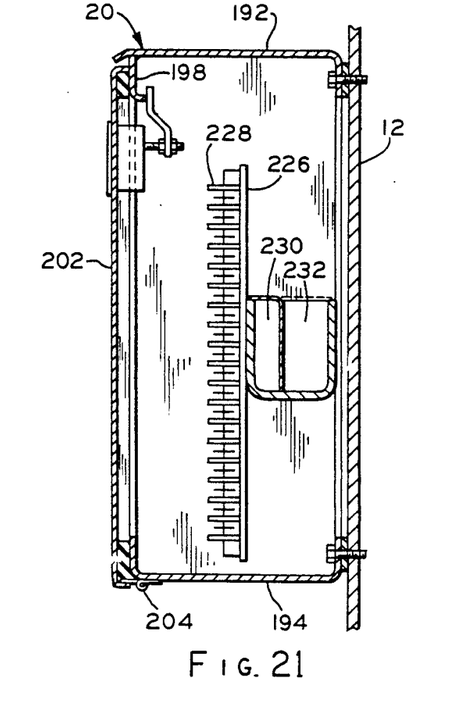
FIG. 21 is a sectional view of the accessories conduit assembly as shown in FIG. 20 and taken along line 21—21 of FIG. 20.

The accessories conduit box 20 can readily be seen in greater detail by viewing FIGS. 20 and 21. In these Figures, the accessories conduit box 20 is shown as having upper, lower, side, front and back sections 192, 194, 196, 198, and 200, respectively, of sheet metal physically secured together as by welding. Smaller apertures are provided in the side panel 39 of the motor frame assembly 12, and these apertures permit the passage of probe and sensor wires from appropriate probes and sensors internal of the machine.

The front section 198 includes inturned flanges to thereby create an opening only slightly smaller in size than the entire front section 198 of the accessories conduit box or assembly 20. The front section 198 is covered with a door 202 having an inturned flange at its lower end. The inturned flange of the door is secured to one segment of a hinge 204 while the other segment of the hinge is secured to the lower section 194 adjacent the inturned flange. With appropriate latches secured to the door at its upper portion, opening and closing of the door is readily and easily achieved.

Inside accessories conduit box 20, there are vertically extending partitions 206, 208 and 210 as of sheet metal to physically divide the chamber within the accessories conduit box into a plurality of zones, or compartments, for example 212, 214, 216, and 218. By way of example only, a compartment 212 at the left end as viewed in FIG. 20 may be permanently wired so as to couple proximeter therein to probes located at the bearing assemblies 26 for the purpose of determining vibrations at each bearing assembly.

A second compartment 214 is for various signal leads and constitutes the signal lead compartment. These leads are typically under 50 volts and may power bearing thermocouples for temperature sensing and operate bearing and stator resistive temperature devices.

A third compartment 216 is for the power lead terminals of 50 volts or greater. These are used to power the heater elements as they are described above, as well as for instance oil heaters, a stator winding thermostat, and differential pressure switches for air filters or any other optional accessory devices requiring 50 volts or greater.

These two central compartments 214, 216 include insulating terminal blocks 226 having conductive terminals 228 whereby the leads from at least the aforementioned accessory devices may be appropriately coupled, uncoupled or modified as may be desired or required because of the configuration of the motor in which they are utilized. The insulating terminal blocks 226 are secured to the back section 200 of acessories conduit box 20 through a pair of wireways or conduits 230 and 232. The conduits provide an opening through the second and third compartments 214 and 216 and are exposed at their ends to the first and fourth compartments 212 and 218, respectively.

The conduit 230 is for carrying signal leads and has an opened upper face through the compartment 214 but is closed at the compartment 216. The conduit 232 is closed in the first signal compartment 214 where the conduit 230 is open. Conduit 232 is open in the second or power conduit compartment 216 where the conduit 230 is closed. In this manner the conduits of each compartment will have an open and a closed face. In the compartment 216 for the higher power leads, the power leads will be in the opened conduit. In the compartment with the signal leads, the conduit 230 will be open and the conduit 232 with the power leads will be closed. This arrangement allows the appropriate power leads to be attached to the appropriate terminals of each chamber. The arrangement will expose only those wires to be utilized at such compartment and will preclude inadvertent utilization of leads of improper voltage or origin. This arrangement will enchance the safety of any and all electrical devices in which it is utilized.

A fourth compartment 218 may house a bearing temperature monitor which is mounted in a rectangular cutout in the accessories conduit box 20. This monitor includes, on the external face of the door, light-emitting diode-type readouts to display the temperature of the bearings at both ends of the motor. Alarm temperatures and trip temperatures may also be provided as readouts for each bearing.

As described above, both the accessories conduit box 20 and power conduit assembly 24 may both be positioned on a common side of the frame assembly 12. In that arrangement, the compartment 212 containing the proximeter probe terminations is eliminated. The proximeter probe terminations may be made in compartment 218 if the bearing temperature modules are deleted.

The present disclosure includes that contained in the appended claims as well as that of the foregoing description. Although this invention has been described in its preferred form or embodiment with a certain degree of particularity, it is understood that the present disclosure of the preferred form has been made only by way of example and that numerous changes in the details of construction, fabrication and use and including the combination and arrangement of parts may be resorted to by those skilled in the art without departing from the spirit and scope of the invention.

What is claimed is:

1. A dynamoelectric machine comprising:
a frame having at least one aperture therein;
an accessories conduit box mounted to said frame and including a plurality of means for separating said accessories conduit box into a plurality of discrete compartments, another aperture in said accessories conduit box communicating with one of said discrete compartments and said at least one aperture, a pair of conduits extending between said discrete compartments across said separating means and defining a pair of channels communicating with at least said one discrete compartment, a pair of openings in said conduits communicating between said channels and at least another two of said discrete compartments, respectively, and at least a pair of insulating terminal blocks disposed in said at least another two discrete compartments, respectively;
a plurality of operating components of the dynamoelectric machine disposed within said frame;
a plurality of leads connected with at least some of said operating components and extending through said at least one aperture and said another aperture into said one discrete compartment, some of said leads of a predetermined voltage range passing from said one discrete compartment through one of said channels and one of said openings in one of said conduits into one of said at least another two discrete compartments to connect with one of said insulating terminal blocks therein, and others of said leads of another predetermined voltage range different than the first named predetermined voltage range passing from said one discrete compartment through the other of said channels and the other of said openings in the other of said conduits into another of said at least another two discrete compartments to connect with another of said insulating terminal blocks therein.

2. A dynamoelectric machine comprising:
a frame;
an accessories conduit box mounted to said frame and including a plurality of means for separating said accessories conduit box into a plurality of discrete compartments, at least one insulating terminal block in each of at least two of said discrete compartments, a pair of conduits extending between said discrete compartments across said separating means and communicating with said at least two discrete compartments, respectively;
a plurality of operating components of the dynamoelectric machine disposed within said frame; and
a plurality of leads connected with at least some of said operating components and extending through said frame into said accessories conduit box, some of said leads of one predetermined electrical characteristic passing through one of said conduits so as to be connected with said at least one insulating terminal block in one of said at least two discrete compartments and others of said leads of another predetermined electrical characteristic different than the one predetermined electrical characteristic passing through the other of said conduits so as to be connected with said at least one insulating terminal block in another of said at least two discrete compartments.

3. The dynamoelectric machine as set forth in claim 2 wherein said at least one insulating block in each of said at least two discrete compartments is mounted to at least one of said one and other conduits.

4. The dynamoelectric machine as set forth in claim 2 wherein said accessories conduit box further includes a door selectively openable and closeable to expose and close off another of said discrete compartments.

5. The dynamoelectric machine as set forth in claim 2 wherein said accessories conduit box further includes a pair of openings in said conduits communicating with said at least two discrete compartments, respectively, said some leads passing through one of said openings and said other leads passing through the other of said openings.

6. The dynamoelectric machine as set forth in claim 2 wherein said accessories conduit box further includes aperture means for the passage of said leads from said frame into a third one of said discrete compartments, said conduits each communicating with said third one discrete compartment to pass said some leads and said other leads from said third one discrete compartment into said one and another at least two discrete compartments.

7. The dynamoelectric machine as set forth in claim 2 wherein said accessories conduit box further includes visual readouts associated with at least a third one of said discrete compartments.

8. The dynamoelectric machine as set forth in claim 2 wherein the one and another predetermined electrical characteristics of said some and other leads comprise different predetermined voltage ranges.

* * * * *